United States Patent
Berard

(10) Patent No.: US 10,135,251 B2
(45) Date of Patent: Nov. 20, 2018

(54) APPARATUS AND METHOD FOR CONTROLLING A MICROGRID

(71) Applicant: SCHNEIDER ELECTRIC IT CORPORATION, West Kingston, RI (US)

(72) Inventor: Olivier Berard, Voreppe (FR)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 204 days.

(21) Appl. No.: 15/108,901

(22) PCT Filed: Dec. 31, 2013

(86) PCT No.: PCT/US2013/078418
§ 371 (c)(1),
(2) Date: Jun. 29, 2016

(87) PCT Pub. No.: WO2015/102598
PCT Pub. Date: Jul. 9, 2015

(65) Prior Publication Data
US 2016/0329713 A1 Nov. 10, 2016

(51) Int. Cl.
*H02J 13/00* (2006.01)
*H02J 3/28* (2006.01)
(Continued)

(52) U.S. Cl.
CPC ............... *H02J 3/382* (2013.01); *H02J 3/24* (2013.01); *H02J 3/32* (2013.01); *H02J 3/381* (2013.01);
(Continued)

(58) Field of Classification Search
CPC .. H02J 3/382; H02J 3/383; H02J 3/381; H02J 3/32; H02J 3/24; H02J 3/386; H02J 9/066; H02M 5/04; Y02E 70/30; Y02B 10/72
See application file for complete search history.

(56) References Cited

U.S. PATENT DOCUMENTS

| 4,560,916 A | 12/1985 | Yoshiyuki et al. |
| 7,355,301 B2 * | 4/2008 | Ockert ...................... H02H 3/24 307/29 |
| 7,702,424 B2 * | 4/2010 | Cannon ................... H04L 12/10 340/539.1 |
| 7,983,799 B2 | 7/2011 | Bose et al. |
| 8,159,178 B2 | 4/2012 | Serban |
| 8,258,759 B2 | 9/2012 | Yin et al. |
| 2007/0040540 A1 | 2/2007 | Cutler |

(Continued)

FOREIGN PATENT DOCUMENTS

| CN | 103001223 A | 3/2013 |
| CN | 103138290 A | 6/2013 |

OTHER PUBLICATIONS

Armenta-Deu C.: "Prediction of Battery Behaviour in SAPV applications" XP004417242; dated 2003; (14 pages).
(Continued)

*Primary Examiner* — Kenneth B Wells
(74) *Attorney, Agent, or Firm* — Lando & Anastasi, LLP

(57) ABSTRACT

Aspects and embodiments described herein are directed to power interface devices and methods. In one aspect, a method for controlling a microgrid is provided. The microgrid includes a power interface device coupled to one or more microgrid elements comprising power sources and loads. The method includes determining, by the power interface device, a mode of operation of the microgrid, determining a power load of the one or more microgrid elements, and based on the mode of operation of the microgrid and the power load of the one or more microgrid elements, adjusting, by the power interface device, a frequency of a voltage of the power interface device to control the one or more microgrid elements.

20 Claims, 12 Drawing Sheets

(51) Int. Cl.
*H02M 5/04* (2006.01)
*H02J 3/38* (2006.01)
*H02J 3/24* (2006.01)
*H02J 3/32* (2006.01)
*H02J 9/06* (2006.01)

(52) U.S. Cl.
CPC .............. *H02J 3/383* (2013.01); *H02J 3/386* (2013.01); *H02M 5/04* (2013.01); *H02J 9/066* (2013.01); *Y02B 10/72* (2013.01); *Y02E 70/30* (2013.01)

(56) References Cited

U.S. PATENT DOCUMENTS

| | | |
|---|---|---|
| 2007/0246943 A1 | 10/2007 | Chang et al. |
| 2008/0106921 A1 | 5/2008 | Dickerson et al. |
| 2008/0151583 A1 | 6/2008 | Matsumoto |
| 2008/0290252 A1 | 11/2008 | Leonhardt et al. |
| 2009/0103340 A1 | 4/2009 | Bremicker et al. |
| 2009/0180262 A1 | 7/2009 | Knopf et al. |
| 2012/0083939 A1 | 4/2012 | Rognli |
| 2012/0299386 A1 | 11/2012 | Kaufman et al. |
| 2013/0274947 A1 | 10/2013 | Miller et al. |

OTHER PUBLICATIONS

Each PV system is unique, SMA has the right solution for every application http://www.sma-america.com/en US/products/overview. html (downloaded 8/6/9); (2 pages).

Gules R. et al.: "A Maximum Power Point Tracking System With Parallel Connection for PV Stand-Alone Applications" XPO 11226625; dated 2008; (10 pages).

New V/f-Statics controlled Battery Inverter: Sunny Island®—the key component for AC-Coupled Hybrid Systems and Mini Grids, Mike Meinhardt, Martin Rothert, Alfred Engler; (downloaded Dec. 1, 2009); (6 pages).

Notification of Transmittal of the International Search Report and the Written Opinion of the International Searching Authority from corresponding PCT/US2013/078418 dated Jun. 2, 2014.

Oasis Montana Batteryless Grid-Tie Electric Power Systems, Just what is a Grid-tied PV System? Oasis Montana Inc., http://www.grid-tie.com/ (downloaded Aug. 6, 2009); (3 pages).

Oasis Montana Xantrex XW Series Power Inverters, Oasis Montana Inc., http://www.oasismontana.com/Xantrex-xw-inverter.html (downloaded Aug. 6, 2009); (4 pages).

Solartechnology Sunny Island 4248U, Battery Inverter/Charger for Stand-Alone and Back-up Applications Installation & Operating Instructions; Dated 2004 ( 100 pages).

The Solar Guide, Grid-Tie Inverters (Synchronous Inverters) http://www.thesolarguide.com/solar-energy-systems/grid-tie-inverters.aspx (downloaded Aug. 6, 2009); ( 1 page).

Thomas Degner et al.: "Interconnection of Solar Powered MiniGrids—A Case Study for Kythnos Island" XP040511137; dated 2004; ( 4 pages).

Extended European Search Report from corresponding European Application No. 13900762.9 dated Sep. 8, 2017.

Interconnection of solar powered mini-grids—A case study for Kythnos Island, Nineteenth European Photovoltaic Solar Energy Conference : Proceedings of the International Conference Held in Paris, France, Jun. 7-11, 2004.

* cited by examiner

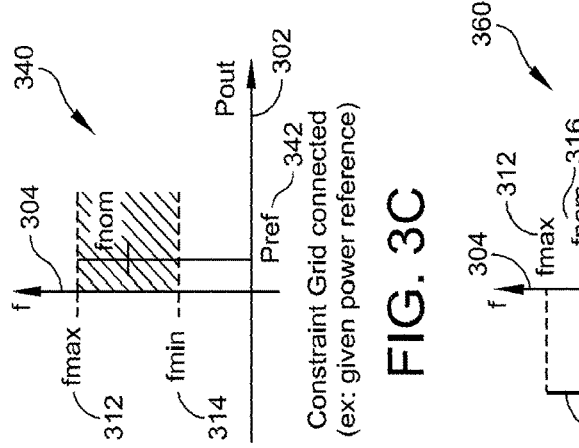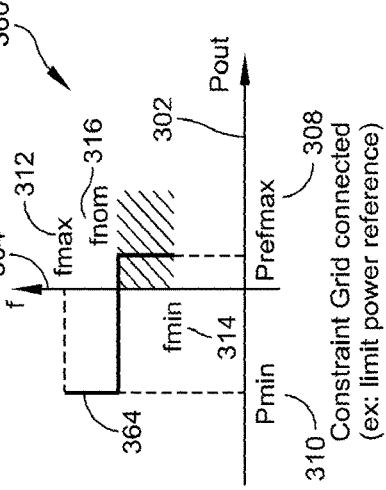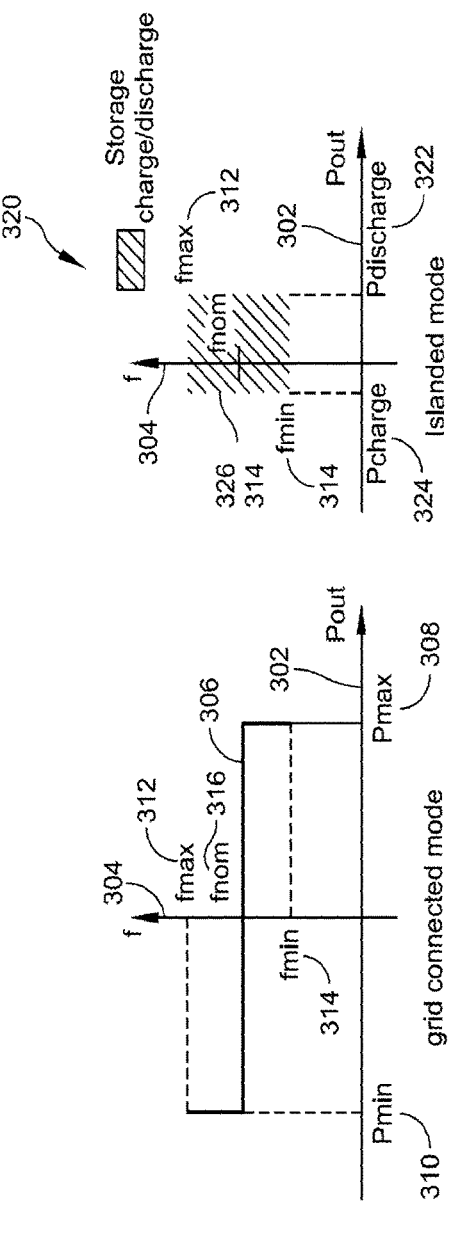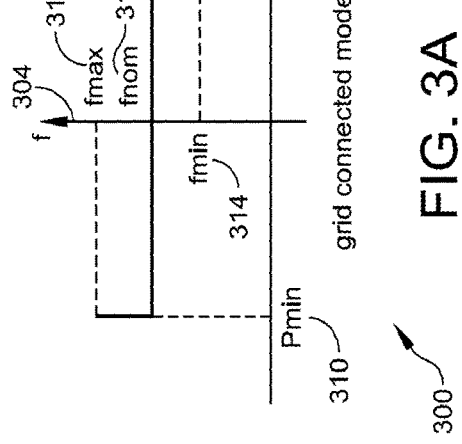

APPARATUS AND METHOD FOR CONTROLLING A MICROGRID

CROSS-REFERENCE TO RELATED APPLICATIONS

This application is a U.S. National Stage Application under 35 U.S.C. § 371 of International Application No. PCT/US2013/078418, filed Dec. 31, 2013, titled CONTROLLING A MICROGRID, which is hereby incorporated herein by reference in its entirety.

BACKGROUND

Field of Invention

At least one embodiment of the present invention relates generally to control of a microgrid.

Discussion of Related Art

A microgrid can be a small local grid, which can include one or more various power sources. For example, a microgrid can include a wind generator, a solar generator, a diesel generator, and other power generators. The microgrid can also include loads. For example, the microgrid can include a building, a data center, a harbor, an industrial site, a campus, or even a small town. The microgrid can also be connected to a larger grid, such as a power utility. The utility can provide power to the microgrid, for example, to provide additional power to the loads and/or to improve reliability.

SUMMARY OF THE DISCLOSURE

Aspects and embodiments described herein are directed to power interface devices and methods. In one aspect, a method for controlling a microgrid is provided. The microgrid includes a power interface device coupled to one or more microgrid elements comprising power sources and loads. The method includes determining, by the power interface device, a mode of operation of the microgrid, determining a power load of the one or more microgrid elements, and based on the mode of operation of the microgrid and the power load of the one or more microgrid elements, adjusting, by the power interface device, a frequency of a voltage of the power interface device to control the one or more microgrid elements.

The method may further include receiving, by the one or more microgrid elements, the voltage, and based on the frequency, adjusting an input or output power of the one or more microgrid elements. In the method, adjusting the frequency of the voltage of the power interface device may include increasing the frequency of the voltage over a first threshold, receiving the voltage may include receiving the voltage by a load of the one or more microgrid elements, and adjusting the input or output power may include increasing the input power of the load. In the method, adjusting the frequency of the voltage of the power interface device may include increasing the frequency of the voltage over a second threshold, receiving the voltage may include receiving the voltage by a power source of the one or more microgrid elements, and adjusting the input or output power may include decreasing the output power of the power source.

In the method, adjusting the frequency of the voltage of the power interface device may include decreasing the frequency of the voltage below a third threshold, receiving the voltage may include receiving the voltage by a power source of the one or more microgrid elements, and adjusting the input or output power may include increasing the output power of the power source. In the method, adjusting the frequency of the voltage of the power interface device may include decreasing the frequency of the voltage below a fourth threshold, receiving the voltage may include receiving the voltage by a load of the one or more microgrid elements, and adjusting the input or output power may include decreasing the input power of the load.

The method may further include configuring upper and lower thresholds for the one or more microgrid elements based on a type of the one or more microgrid elements. The power interface device may be coupled to an energy storage system, and the method may further include receiving by the energy storage system, the voltage; and based on the frequency of the voltage, adjusting an input or output power of the energy storage system.

In the method, the power interface device may be coupled to a generator, and the method may further include receiving by the generator, the voltage, and based on the frequency of the voltage, adjusting an output power of the generator.

Another aspect is directed to a control system for a microgrid having one or more microgrid elements. The control system includes a power interface device including a first power interface configured to couple to an electric utility, a second power interface configured to couple to the microgrid, a power conversion circuit coupled to the first power interface and the second power interface, and a controller coupled to the power conversion circuit. The controller is configured to determine a mode of operation of the microgrid, detect an output power from the one or more microgrid elements, and based on the mode of operation of the microgrid and the output power from the one or more microgrid elements, adjust a frequency of a voltage at the second power interface to control the one or more microgrid elements.

The control system may be further configured to, based on the frequency of the voltage, adjust an input or output power of the one or more microgrid elements. The control system may also be configured to adjust the frequency of the voltage of the output power by increasing the frequency of the voltage over a first threshold, and in response to increasing the frequency, increase the input power of a load coupled to the microgrid. The control system may be further configured to adjust the frequency of the voltage of the output power by increasing the frequency of the voltage over a second threshold, and in response to increasing the frequency, decrease the output power of a power source of the microgrid. The control system may be further configured to adjust the frequency of the voltage of the output power by decreasing the frequency of the voltage below a third threshold, and in response to decreasing the frequency, increase the output power of the power source. The control system may be further configured to adjust the frequency of the voltage of the output power by decreasing the frequency of the voltage below a fourth threshold, and in response to decreasing the frequency, decrease the input power of the load. The control system may be further configured to configure upper and lower thresholds for the one or more microgrid elements based on a type of the one or more microgrid elements.

The microgrid may include an energy storage system, and the control system may be further configured to, based on the frequency of the voltage, adjust an input or output power of the energy storage system. The microgrid may also include a generator, and the control system may be further configured to, based on the frequency of the voltage, adjust an output power of the generator.

Another aspect is directed to a microgrid that includes a plurality of microgrid elements comprising a power source and a load, a power interface device comprising a first power interface configured to couple to an electric utility, a second power interface configured to couple to the one or more microgrid elements, a power conversion circuit coupled to the first power interface and the second power interface, and a controller coupled to the power conversion circuit, the controller configured to determine a mode of operation of the microgrid, and based on the mode of operation of the microgrid adjust a frequency of a voltage of the output power to control the plurality of microgrid elements.

In the microgrid, the load may be configured to receive the voltage and based on the frequency adjust a power draw of the load, and the power source may be configured to receive the voltage, and based on the voltage adjust a power output level of the power source.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A-3D are graphs showing example outputs of a power interface device for various modes in accordance with an embodiment;

DETAILED DESCRIPTION

Figure 1:
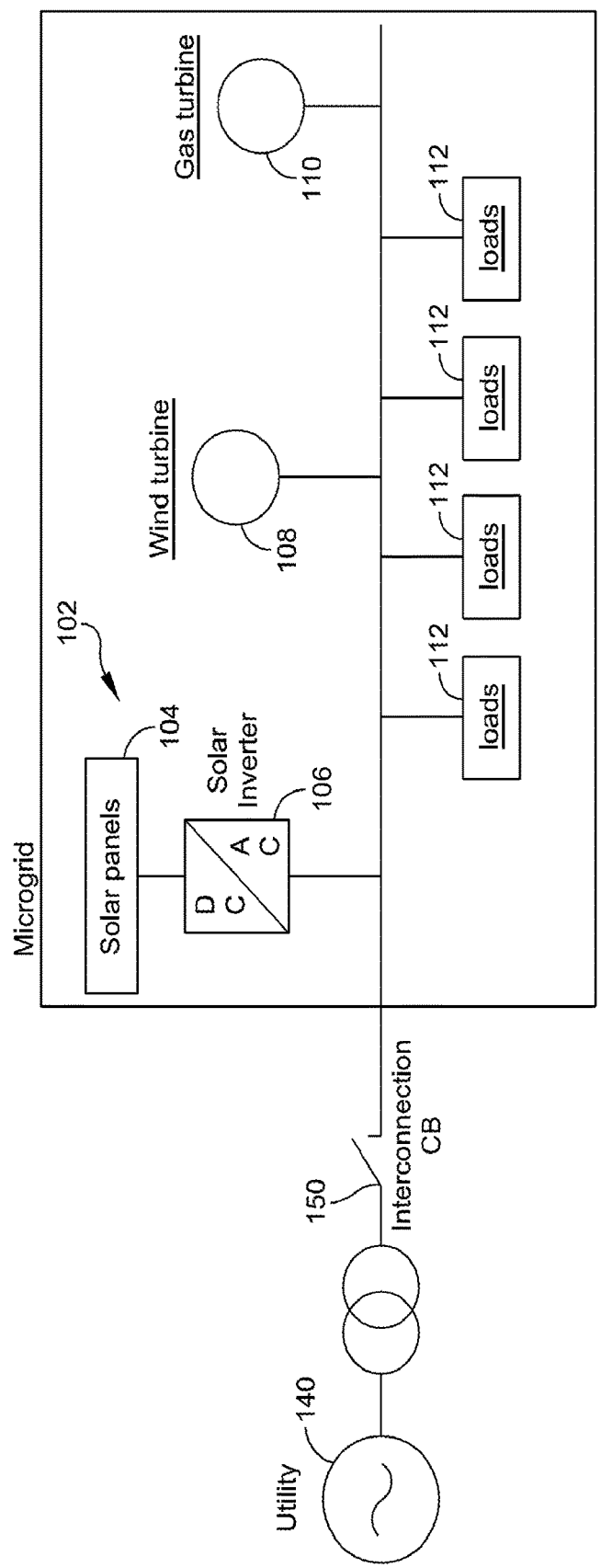
FIG. 1 is a functional block diagram depicting an example microgrid in accordance with the prior art.

A microgrid can include elements such as power sources and loads. Power sources can include sources such as renewable energy sources and other power sources. Renewable energy sources can include power sources such as solar power generators, wind turbines, and other sources of renewable energy. The microgrid can also include power generators such as diesel generators. The microgrid can be coupled to a larger grid, such as an electric utility. A power interface device can provide an interface between the microgrid and the larger grid. The power interface device can also be used to control the elements of the microgrid. For example, the power interface device can be a frequency converter, which can adjust the frequency of a voltage on a bus coupling the elements of the microgrid to each other. The frequency converter can use the frequency of the voltage to communicate to the elements instructions, for example, based on power output of the power sources, power drawn by the loads, and operating modes of the microgrid. In some embodiments, the power interface device can be an uninterruptible power supply (UPS) configured to control the microgrid.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter, equivalents thereof, and additional items, as well as alternate embodiments consisting of the items listed thereafter exclusively.

Various aspects and embodiments are directed to uninterruptible power supplies. In one example, an uninterruptible power supply (UPS) may include an inverter, a controller, and a bypass switch. The controller operates the inverter during online operation to regulate the inverter output voltage and to provide output voltage from the inverter at the UPS output. The controller can also operate the inverter during bypass and other operation modes to provide, among other things, power factor correction, harmonic current distortion control, and active power to charge a backup power source. The controller can time the operation of switches in the inverter to provide output voltage.

FIG. 1 shows an example prior art microgrid 100. The microgrid 100 has multiple power sources. The power sources include renewable energy sources, such as a solar generator 102 and a wind turbine 108. The solar generator 102 includes solar panels 104 coupled to a solar inverter 106. The power sources also include a gas-powered generator 110. The microgrid 100 also includes one or more loads 112. The microgrid is connected to a larger grid, including a power utility 140. The microgrid 100 is connected to the utility 140 via an interconnection 150. In some prior art embodiments, the interconnection 150 is a circuit breaker or other switch.

The microgrid 100 receives power from the utility 140, such as when power demand from the one or more loads 112 exceeds power provided by the power sources 102, 108, 110. For example, power provided by renewable energy sources, such as the solar generator 102 and the wind turbine 108 can fluctuate depending on factors such as the environment. Solar generators 102 may be able to provide more energy on sunny days relative to cloudy days or during the night. Wind turbines 108 can be dependent on the strength of the wind to provide power. In such instances as when the renewable energy sources are providing less power, power can be drawn from the utility 140 to meet demands of the loads 112.

Further, as there may be fewer loads 112 on the microgrid 100 compared to a larger grid, the amount of power demanded by the loads 112 can vary more widely, as larger grids with more loads can take advantage of averaging effects between the greater number of loads. With a wider variation in aggregate load, regulation of multiple power sources 102, 108, 110 operating in parallel can become complex.

Generally, if the microgrid 100 is connected to the utility 140 by a direct connection, such as the interconnection 150, the microgrid 100 is operated at the same voltage and frequency as the utility 140. When connected to a utility, the microgrid 100 can also be exposed to disturbances in the utility. The interconnection 150 can be opened to disconnect the microgrid 100 from the larger grid and the utility 140. For example, the microgrid 100 can be disconnected from the larger grid when the utility 140 is off or providing low-quality power.

Figure 2:
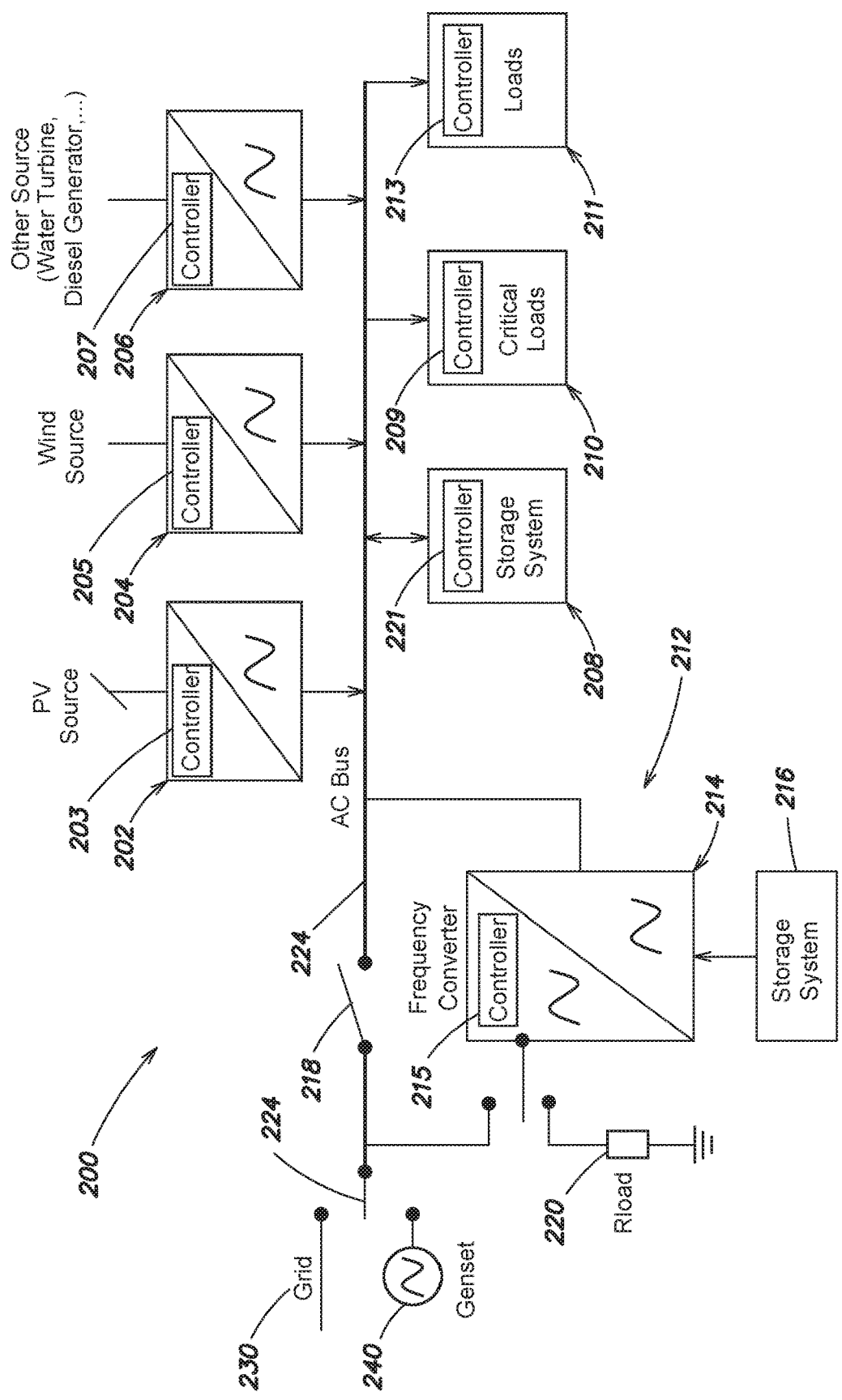
FIG. 2 is a functional block diagram depicting an example microgrid including an example power interface device in accordance with an embodiment.

FIG. 2 shows a block diagram of an example microgrid 200. In some embodiments, the microgrid 200 includes renewable power sources, such as a photovoltaic source 202 (e.g., a solar generator) and a wind source 204 (e.g., a wind turbine). The microgrid 200 includes other sources 206, which can include hydroelectric sources, diesel generators, and other such power sources. The microgrid 200 also includes a storage system 208 for storing power (e.g., batteries), critical loads 210 and non-critical loads 211. The elements of the microgrid 200 can be coupled on an AC bus 222.

The microgrid 200 also includes a power interface device 212. In some embodiments, the power interface device 212 includes a frequency converter 214 and a storage system 216 (e.g., one or more batteries). The power interface device 212 can also include a switch 218, which can enable a bypass mode for the power interface device 212. The power interface device 212 also includes a controller 215. In some embodiments, the controller 215 includes at least one processor or other logic device. In some embodiments, the controller 215 includes a digital signal processor (DSP). The controller 215 may also include at least one field programmable gate array (FPGA) and an application specific integrated circuit (ASIC), or other hardware, software, firmware, or combinations thereof. In various embodiments, one or more controllers may be part of the power interface device 212 or external to but operatively coupled with the power interface device 212.

The power interface device 212 is coupled to a resistive load 220 used for power absorption, as will be described in further detail below. The power interface device 212 can be coupled to a larger grid 230 or a generator set (genset) 240 by a switch 224. The larger grid 230 or the genset 240 can provide additional power to the microgrid 200, for example, when a demand from the loads 210, 211 exceeds power generated by the power sources 202, 204, 206. In some embodiments, the larger grid 230 can also receive power from the microgrid 200, for example, when the power generated by the power sources 202, 204, 206 exceeds power demanded by the loads 210, 211 and a surplus of power is generated. In at least one embodiment, the controller determines the difference between power produced on the microgrid and power loads of the microgrid based on measurements of power flow at the frequency converter 214 and/or at the switch 218.

In some embodiments, the microgrid 200 can be controlled by the power interface device 212 by adjusting a frequency of a microgrid voltage on the AC bus 222. The elements of the microgrid 200 including the power sources 202, 204, 206, the loads 210, 211, and the storage system 208 can be configured to determine the frequency of the microgrid voltage and respond based on the frequency. The power interface device 212 can determine power levels of the microgrid, such as surplus power generated by the power sources 202, 204, 206 or excess power demanded by the loads 210, 211 and adjust the frequency to communicate instructions to the elements to maintain stability of the microgrid 200. For example, loads 210, 211 can be configured to decrease demand and/or shutdown based on a received frequency below a threshold level. Conversely, power sources can be configured to increase production if the received frequency is below a threshold level. In some embodiments, by communicating with microgrid elements using the frequency of the microgrid voltage, additional communication media and wiring can be reduced. In some embodiments, communication via the microgrid voltage frequency can also reduce potential for attack of the microgrid control, such as by hackers. The power sources 202, 204, 206, the loads 210, 211, and the storage system 208 can each include controllers 203, 205, 207, 209, 213, 221, respectively, to interpret the communications from the power interface device 212 via the microgrid voltage and adjust the behavior of the microgrid element accordingly.

The microgrid 200 can operate in various modes, such as a grid-connected mode. In grid-connected mode, the microgrid 200 is connected to the grid 230 via the switch 224 and the power interface device 212. The grid 230 provides active and reactive power to the microgrid 200 to offset imbalance between power production and demand on the microgrid 200. In some embodiments, the microgrid 200 monitors a quality of the power provided by the grid 230. If the power quality of the grid 230 is within a threshold tolerance, the power interface device 212 can operate in a bypass mode and allow the power from the grid 230 to bypass components of the power interface device 212, such as the frequency converter 214, via the switch 218. By bypassing components of the power interface device 212, the power interface device 212 can operate more efficiently, while continuing to monitor the power quality for changes, such as falling outside the threshold tolerance. In some embodiments, the power interface device 212 can bypass a subset of components and continue to pass the current through another subset of components, such as to provide filtering or power factor correction. If the power quality of the grid 230 is outside the threshold tolerance, the power interface device 212 can filter the power to provide power to the microgrid 200 within the threshold tolerance.

In some embodiments, the power interface device 212 can use the resistive load 220 to absorb power. For example, the microgrid 200 can be operating in an islanded mode, where the microgrid 200 is not connected to the grid 230. If the power sources 202, 204, 206 generate more power than is being used by the loads 210, 211, the power interface device 212 can absorb excess power by coupling to the resistive load 220. By coupling to the resistive load 220 at the input of the power interface device 212 by a switch, the power interface device 212 can adaptively absorb variable amounts of excess power. As the power interface device 212 sends instructions to the power sources 202, 204, 206 and the loads 210, 211 via the frequency on the bus, the power interface device 212 absorbs power until the microgrid 200 is stabilized by changes in input and/or output by the power sources 202, 204, 206 and the loads 210, 211. Thus, the power absorbed by the power interface device 212 is variable using the resistive load 220. In some embodiments, the resistive load 220 is a fixed resistive load, while in other embodiments, the resistance may be variable and controllable by the power interface device 212 based on an amount of excess power to be absorbed by the resistive load. The power interface device in some embodiments determines the excess power and adjusts the resistance of the load 220 accordingly.

Referring also to FIG. 3A, a graph 300 of an example output of the power interface device 212 is shown when the microgrid 200 is operating in grid-connected mode. The graph 300 shows an output frequency (f) 304 of the power interface device 212 based on an output power (Pout) 302 to the microgrid 200. If the output power 302 is within a threshold, such as below a Pmax 308 and above a Pmin 310, the grid 230 is able to supply active or reactive power to maintain stability on the microgrid 200. For example, if the power sources 202, 204, 206 are generating a surplus of power relative to the power demanded by the loads 210, 211, the power interface device 212 can provide the surplus power to the grid 230. In some embodiments, the microgrid 200 can sell the surplus power to the grid 230. Conversely, if the loads 210, 211 are demanding more power than can be supplied by the power sources 202, 204, 206, the grid 230 can provide power to the microgrid 200 via the power interface device 212 to maintain a balance of power supply and demand. As the grid 230 can supply or receive power as needed and the microgrid 200 can be stabilized within the threshold Pout 302, the output frequency 304 generated by the power interface device 212 can be a frequency fnom 316, which can indicate to the elements of the microgrid 200 that the loads 210, 211 can draw power as needed and the power sources 202, 204, 206 can generate any appropriate amount of power, which can be as much power as possible. A plot 306 shows the output frequency of the power interface device 212 maintained at fnom 316 within the threshold output power between Pmax 308 and Pmin 310.

At Pmax 308, the microgrid 200 can be generating too much excess power. As a result, the power interface device 212 adjusts the output frequency 304 to a frequency of fmin 314. In some embodiments, by dropping the output frequency 304 to fmin 314, the power interface device 212 communicates to the elements of the microgrid 200 that power supply is exceeding power demand by too much. As the elements receive the microgrid voltage on the AC bus 222 with the output frequency at fmin 314, the elements can respond to stabilize the microgrid 200. For example, loads 210, 211 can increase demand, for example, by activating optional components. Power sources 202, 204, 206 can respond to the lower frequency voltage by decreasing output. For example, non-renewable power sources can be shut down or can output less power. The responses of the elements to the different frequencies are described in greater detail below.

At Pmin 310, the microgrid 200 can be drawing too much power relative to the power generated by the microgrid and available via the grid 230. For example, during peak consumption times, the power provided by the grid 230 can have a threshold. In response, the power interface device 212 adjusts the output frequency 304 to a frequency of fmax 312. By raising the output frequency 304 to fmax 312, the power interface device 212 communicates to the elements of the microgrid 200 that power demand is exceeding power supply by too much. As the elements receive the power through the microgrid on the AC bus 22 with the output frequency at fmax 312, the elements can respond to stabilize the microgrid 200. For example, power sources 202, 204, 206 can increase output. For example, a diesel generator that was idle can be started. Loads 210, 211 can respond by decreasing demand or being shut down. For example, optional components can be shut down on loads or non-critical loads 211 can be shut down.

Referring to FIG. 3B, a graph 320 of an example output 326 of the power interface device 212 is shown when the microgrid 200 is operating in an islanded mode. In the islanded mode, the microgrid 200 is disconnected from the grid 230 and the power demanded by the loads 210, 211 is supplied by the power sources 202, 204, 206 and storage systems 208, 216 on the microgrid 200. The graph 320 shows the output frequency 304 of the power interface device 212 based on the output power 302 of the microgrid 200 in islanded mode. If the output power 302 is within a threshold, such as below a Pdischarge 322 and above a Pcharge 324, the power sources 202, 204, 206 and the storage systems 208, 216 of the microgrid 200 are able to supply the power demanded by the loads 210, 211.

For example, if Pout 302 is greater than Pcharge 324 and less than Pdischarge 322, the power interface device 212 can output a frequency between fmax 312 and fmin 314. The storage systems 208, 216 can provide power to the loads 210, 211 when the loads 210, 211 demand more power than the sources 202, 204, 206 are generating. Conversely, the storage systems 208, 216 can receive power for charging when the sources 202, 204, 206 are generating more power than the loads 210, 211 are using. An algorithm can control the output frequency, for example, based on the amount of power demanded by the loads 210, 211, the amount of power generated by the sources 202, 204, 206, and the amount of power stored in the storage systems 208, 216. For example, the output frequency 304 can be a frequency between fmin 314 and fmax 312 that corresponds to the output power 302 between Pcharge 324 and Pdischarge 322. Alternatively or additionally, the output frequency 304 can be fmax 312 for an output power 302 of Pcharge, fmin 314 for an output power 302 of Pdischarge, and fnom for output power values in between.

FIGS. 3C and 3D show graphs 340, 360 of example outputs of the power interface device 212 when the microgrid 200 is connected to the grid 230 and running in example constrained modes. The graph 340 shows the microgrid 200 with a given power flow reference, such as Pref 342. The output of the power interface device 212 running with a given power flow reference can be similar to that of the power interface device 212 running in the islanded mode described with reference to FIG. 3B. The power interface device 212 can shift the output frequencies between fmax 312 and fmin 314 to correspond to output power 302 shifted by Pref 342. For example, the output power 302 can be between zero (Pcharge 324+Pref 342) and Pdischarge 322+ Pref 342.

FIG. 3D shows the graph 360 of an example output 364 of the power interface device 212 when the microgrid 200 is connected to the grid 230 and running in a power reference limit mode, for example a limited maximum or minimum power. The example output 364 shows an example output frequency constrained by a limited maximum power reference, Prefmax 362. The output frequency 304 can be similar to that of the output 306 of the power interface device 212 in the grid connected mode described with reference to FIG. 3A for Pout 302 from Pmin 310 to zero. For example, the output frequency 304 can be fnom 316 from zero until the output power 302 reaches Pmin 310. At Pmin 310, indicating that the loads 210, 211 of the microgrid 200 are drawing too much power, the power interface device 212 can output fmax 312 to indicate to the loads 210, 211 and the power sources 202, 204, 206 to adjust accordingly.

For Pout 302 greater than zero, the power interface device 212 can output fnom 316 until Pout 302 reaches the Prefmax 362, at which point the power interface device 212 can output fmin 314 to indicate to the loads 210, 211 to draw more power or to the power sources 202, 204, 206 to generate less power. The power interface device 212 can also draw on the storage systems 208, 216 to help maintain the output power at or less than the limited maximum power reference, Prefmax 362.

As the power interface device 212 outputs different frequencies, the devices connected to the microgrid 200 respond accordingly, adjusting outputs to maintain stability on the microgrid 200 as instructed by the output frequency of the power interface device 212. FIGS. 4-7 show example control curves for various types of devices.

Figure 4:
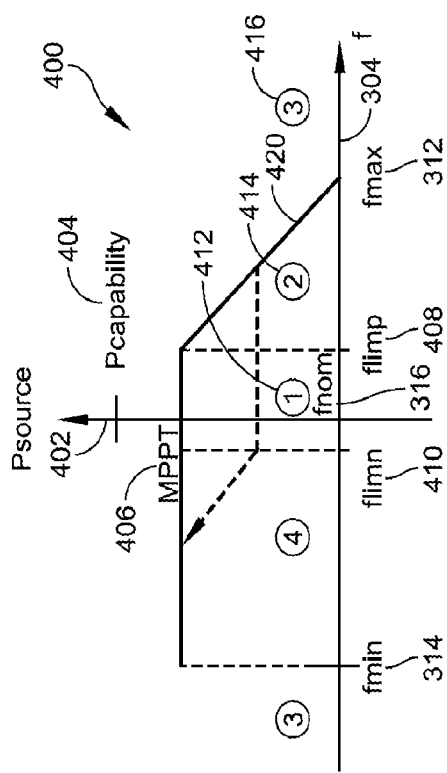
FIG. 4 is a graph showing an example output of a renewable power source in accordance with an embodiment.

FIG. 4 shows a graph 400 of an example control curve 420 for renewable energy sources, such as the photovoltaic source 202 and the wind source 204. In some embodiments, the renewable energy sources can be configured to generate as much power as conditions allow. Excess power generated by renewable energy sources can be provided to the grid 230 and/or stored in the storage systems 208, 216. In some embodiments, such as when the microgrid 200 is operating in islanded mode and the storage systems 208, 216 are fully charged, even renewable energy sources can be instructed to generate less power. The example graph 400 shows an output power of the renewable energy source, Psource 402, in response to the frequency 304 output by the power interface device 212 and received by the renewable energy source. The graph 400 shows four zones of operation 412, 414, 416, 418 of the renewable energy source.

In zone one 412, a zone of operation where the received frequency 304 is between a negative limit frequency, flimn 410, and a positive limit frequency, flimp 408, and including fnom 316, the renewable energy source can remain at the level of output power, such as a maximum output power 406 generated using maximum power point tracking (MPPT). In zone two 414, a zone of operation where the received frequency 304 is greater than flimp 408 and less than fmax 312, the renewable energy source can be configured to ramp down production of power, for example, decreasing output power linearly from the maximum output power 406 to zero. In zone three 416, a zone of operation where the received frequency 304 is greater than fmax 312 or less than fmin 314, the frequency 304 can be considered out of tolerance and the renewable energy source can be disconnected (e.g., by opening a switch connecting the renewable energy source to the microgrid 200). In zone four 418, a zone of operation where the received frequency 304 is less than flimn 410 and greater than fmin 314, the renewable energy source can be configured to ramp up production of power, for example, increasing to MPPT if the output power was less than the maximum output power 406. For example, the illustrated dashed line shows an example output power level that can be reached in zone two 414, when the production of the renewable energy source was ramped down for a certain amount of time before the received frequency 304 decreased back through zone one 412. As the received frequency 304 drops under flimn 410 and enters zone four 418, the output power can be increased back to MPPT. In some embodiments, by implementing flimp 408 and flimn 410 and decreasing production over flimp 408 and increasing production under flimn 410, hysteretic behavior can be implemented for the renewable energy source.

Figure 5:
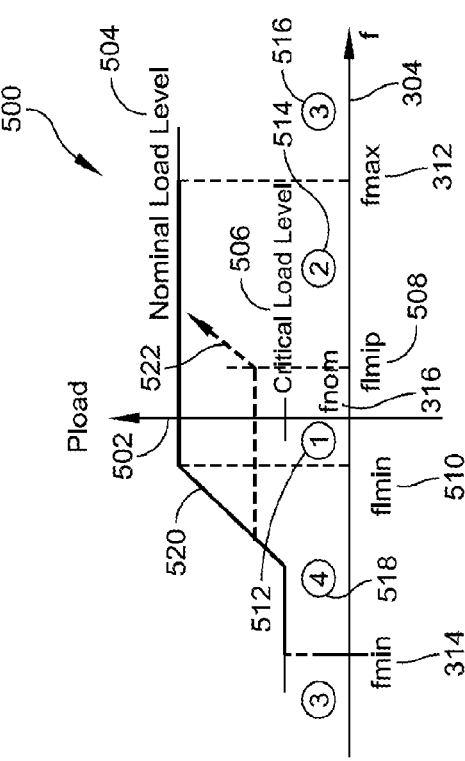
FIG. 5 is a graph showing an example output of a load in accordance with an embodiment.

FIG. 5 shows a graph 500 of an example control curve 520 for loads, such as the loads 211 and the critical loads 210 of the microgrid 200. The example graph 500 shows a power drawn by the load, Pload 502, in response to the frequency 304 output by the power interface device 212 and received by the load. The graph 500 shows four zones of operation 512, 514, 516, 518 of the load.

In zone one 512, a zone of operation where the received frequency 304 is between a negative limit frequency, flimn 510, and a positive limit frequency, flimp 508, and including fnom 316, the load can remain at the level of drawn power, such as a nominal load level 504 of the load. In zone two 514, a zone of operation where the received frequency 304 is greater than flimp 508 and less than fmax 312, the load can be configured to ramp up amount of power drawn, for example, by activating optional and/or potential parts (e.g., water heaters, washing machines) to increase drawn power to the nominal load level 504 if the drawn power was less than the nominal load level 504. In zone three 516, a zone of operation where the received frequency 304 is greater than fmax 312 or less than fmin 314, the frequency 304 can be considered out of tolerance and the load can respond accordingly. For example, non-critical loads can be disconnected (e.g., by opening a switch connecting the non-critical load to the microgrid 200). In some embodiments, critical loads can shed non-critical components and/or enter a shutdown procedure. In zone four 518, a zone of operation where the received frequency 304 is less than flimn 510 and greater than fmin 314, the load can be configured to ramp down demanding of power, for example, shedding components and/or shutting down. In some embodiments, different loads can be configured to respond differently in zones three and four, for example, depending on a criticality of the loads. Different loads can also be configured with different values for flimn and flimp, so that different loads can respond at different points of received frequency 304. For example, more critical loads can be configured with a lower flimn so that the more critical loads remain in zone one, and thus continue running while a load with a higher flimn can start shutting down or respond in some other manner.

The loads can also be implemented with a hysteretic behavior. For example, the dashed line 522 shows an example drawn power level that can be reached in zone four 518, when the demand of the load was ramped down for a certain amount of time before the received frequency 304 increased back through zone one 512. As the received frequency 304 rises over flimp 508 and enters zone two 514, the drawn power can be increased back to the nominal load level 504.

Figure 6:
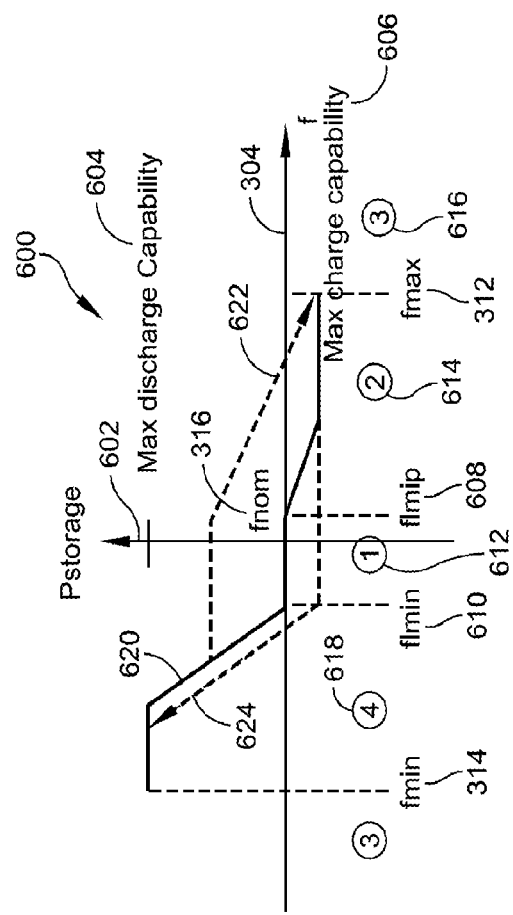
FIG. 6 is a graph showing an example output of a storage device in accordance with an embodiment.

FIG. 6 shows a graph 600 of an example control curve 620 for storage systems, such as the storage systems 208, 216 of the microgrid 200. The example graph 600 shows power received by or provided by the storage system, Pstorage 602, in response to the frequency 304 output by the power interface device 212 and received by the storage systems. The graph 600 shows four zones of operation 612, 614, 616, 618 of the storage system.

In zone one 612, a zone of operation where the received frequency 304 is between a negative limit frequency, flimn 610, and a positive limit frequency, flimp 608, and including fnom 316, the storage system can remain at the level of power, whether the storage system is providing or receiving power. For example, a Pstorage of zero can indicate the storage system is neither providing nor receiving power. In zone two 614, a zone of operation where the received frequency 304 is greater than flimp 608 and less than fmax 312, the storage system can be configured to receive power to charge a battery or otherwise store the power. In zone three 616, a zone of operation where the received frequency 304 is greater than fmax 312 or less than fmin 314, the frequency 304 can be considered out of tolerance and the storage system can be disconnected (e.g., by opening a switch connecting the storage system to the microgrid 200). In zone four 618, a zone of operation where the received frequency 304 is less than flimn 610 and greater than fmin 314, the storage system can be configured to discharge the battery or otherwise provide stored power. In some embodiments, different storage systems can be configured with different values for flimn and flimp, so that different storage systems can respond at different points of received frequency 304. Values for flimn and flimp can also be coordinated with corresponding values for other devices on the microgrid. For example, a storage system can be configured with flimn and flimp values corresponding to values between those of non-critical and critical loads so that the storage system provides power to the microgrid after non-critical loads are shut down.

The storage system can also be implemented with a hysteretic behavior. For example, a dashed line 622 shows an example power level that can be reached in zone four 618, when the storage system was providing power for a certain amount of time before the received frequency 304 increased back through zone one 612. As the received frequency 304 rises over flimp 608 and enters zone two 614, the storage system can ramp down power output, eventually receiving power to charge the storage system. A dashed line 624 shows an example power level that can be reached in zone two 614, when the storage system is receiving power to charge the storage system. As the receiving frequency 304 drops through zone one 612 and below flimn 610, the storage system can increase power output from the power stored during charging.

Figure 7:
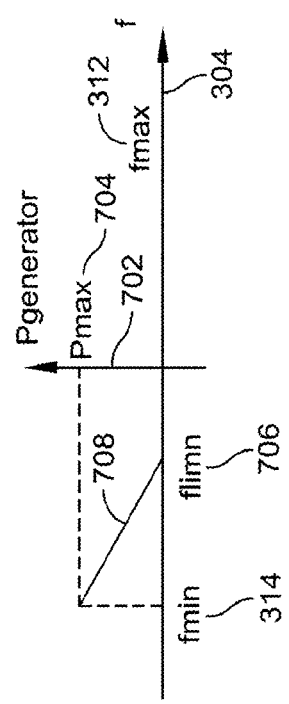
FIG. 7 is a graph showing an example output of a generator in accordance with an embodiment.

FIG. 7 shows a graph 700 of an example control curve 708 for a power source, such as an emergency generator. The emergency generator can be reserved for emergency situations, such as providing power to critical loads. The example graph 700 shows power provided by the generator, Pgenerator 702, in response to the frequency 304 output by the power interface device 212 and received by the generator. As the generator is reserved for critical situations, the generator can output zero for frequencies greater than a negative limit frequency, flimn 706. If the generator receives a frequency below flimn 706, the generator can ramp up output, for example, linearly increasing output until a maximum power output Pmax 704 corresponding to fmin 314.

While the above graphs 400, 500, 600, 700 of FIGS. 4-7 have been described with reference to zones defined by frequencies above and below threshold frequencies, the zones can also include the threshold frequencies. As discussed above, flimp and flimn values can be set depending on the device, the type of device, a characteristic of the device (e.g., criticality), energy cost, and the other devices connected to the microgrid. For example, power sources with a low cost can be configured with a high flimp and flimn to optimize energy cost for the microgrid. More critical loads can also receive high flimp and flimn values to maintain critical operation.

The flimp and flimn values can also be set relative to corresponding values on other devices. For example, when energy production is exceeding demand, an example order of adjustment can be to store energy in the storage systems, activate deactivated loads, and then reduce production of the power sources. Such an order can be implemented by setting flimp values such that flimp_storage<flimp_loads<flimp_sources. When energy demand is exceeding energy production, an example order of adjustment can be to increase production of the power sources, deactivate non-critical loads, use energy stored in the storage systems, and then activate the emergency generator. Such an order can be implemented by setting flimn such that flimn_sources>flimn_loads>flimn_storage>flimn_generator. The values can be differentiated further, for example, between renewable sources and non-renewable sources as well as critical and non-critical loads, or further still, such as individual devices. The flimn and flimp values can also be variable depending on the types of devices, energy cost, and the other types of devices on the microgrid. For example, if an emergency generator is disconnected from the microgrid, flimn of critical loads can be increased to allow more time for the critical loads to respond to the shortage of power, as the emergency generator is no longer available to supply additional power.

Figure 8B:
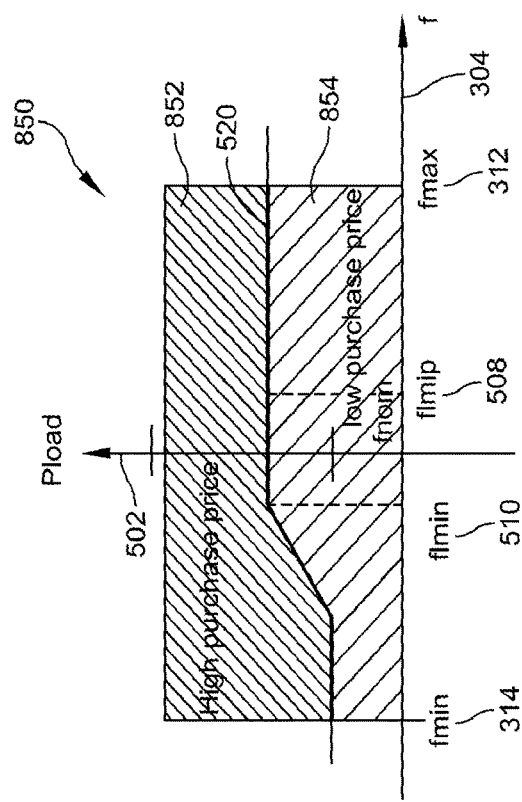
FIGS. 8A and 8B are graphs showing an example implementation in accordance with an embodiment.
Figure 8A:
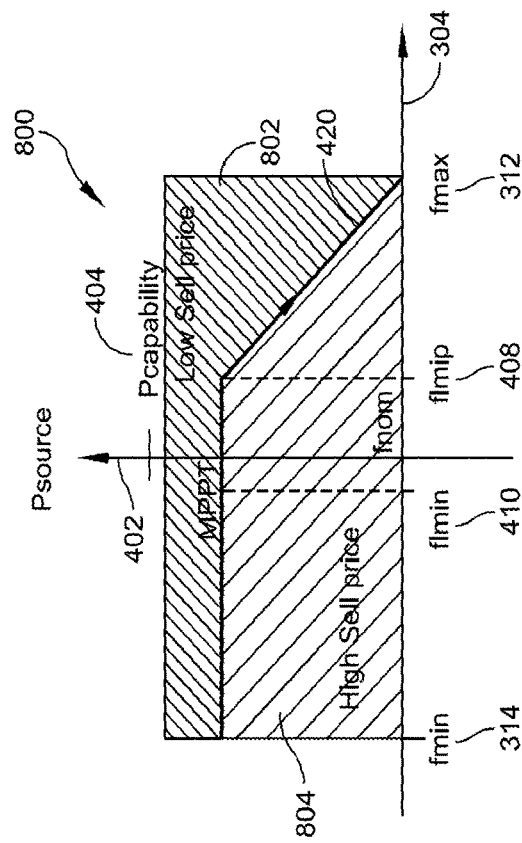

FIGS. 8A and 8B show graphs 800, 850 of an example algorithm for pricing power provided by the microgrid 200 to the loads 210, 211 or bought by the microgrid 200 from the power sources 202, 204, 206. FIG. 8A shows an example selling price from the utility 230 based on the output of the microgrid 200. For example, based on the example control curve 420 for a renewable energy source of FIG. 4, power can be priced low when the output power is above the control curve 420 and high when the output power is below the control curve 420. Similarly, the graph 850 can be based on the control curve for a load of FIG. 5, with power priced high when the output power is above the control curve 520 and low when the output power is below the control curve 520. Additionally or alternatively, the pricing curves can be provided to the sources and the loads and the values of flimn and flimp set accordingly to minimize cost to the microgrid.

Figure 9:
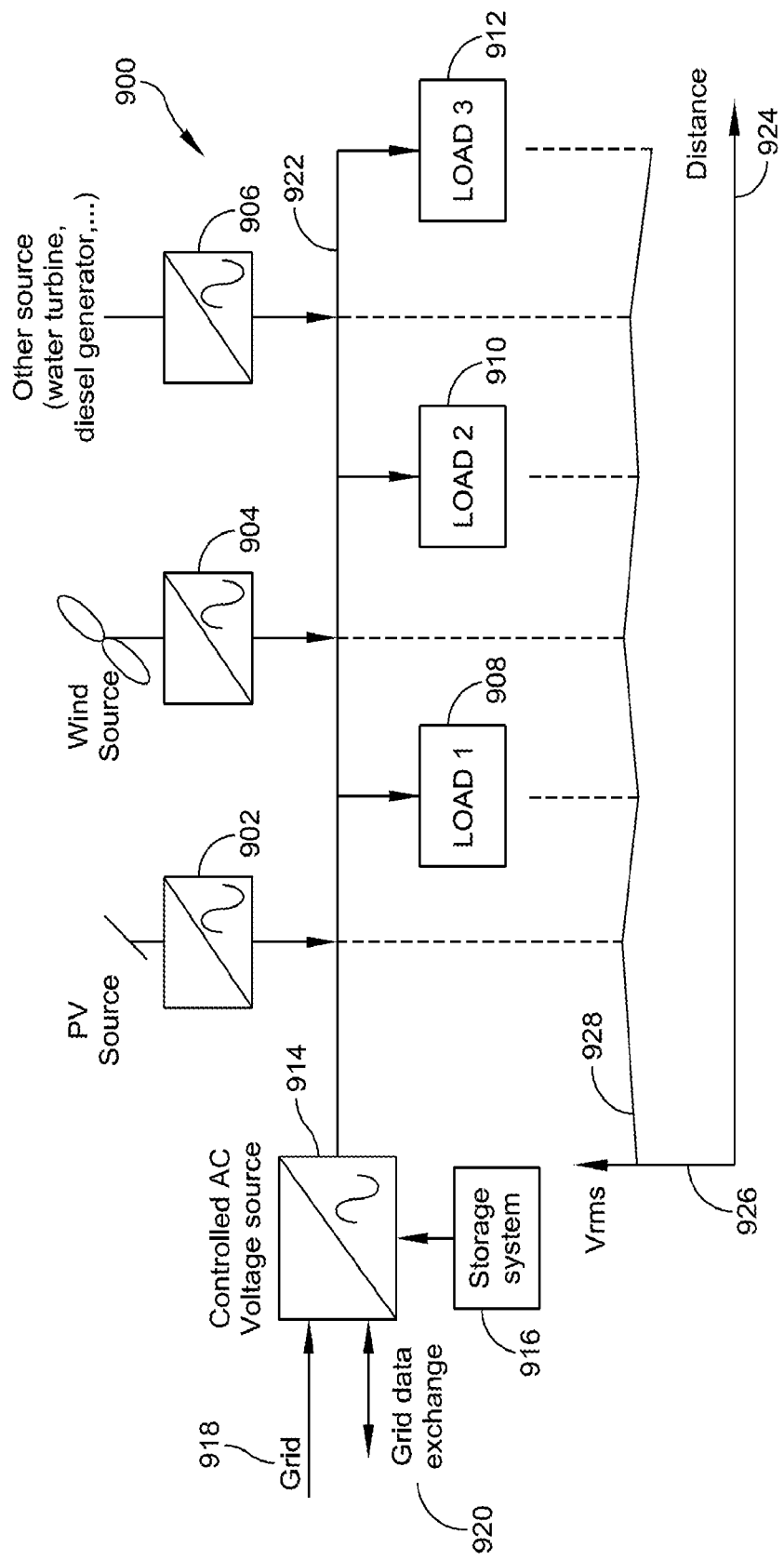
FIG. 9 is a block diagram and graph showing an example voltage in accordance with an embodiment.

In some embodiments, devices can be configured to respond to the received frequency depending also on a local root mean squared (RMS) voltage. For example, FIG. 9 shows a block diagram 900 and a plot 928 showing an example variation in voltage along a bus of the microgrid. In some embodiments, the local voltage can fluctuate along the length of the bus, such as a distribution cable 922. The block diagram 900 shows devices such as power sources 902, 904, 906 and loads 908, 910, 912 connected to the distribution cable 922 of the microgrid. The microgrid is connected to a power interface device 914, which includes a storage system 916. The power interface device 916 is also connected to a grid 918 and a grid data exchange 920. In some embodiments, the local voltage on the distribution cable 922 increases where sources 902, 904, 906 are connected and decreases where loads 908, 910, 912 are connected. The plot 928 shows the variation of the local voltage (Vrms) 924 with the distance 924.

In some embodiments the local voltage at each device can be taken into account for determining the behavior of the device. For example, sources can be configured to have a delay before connecting or disconnecting to the microgrid and/or increasing or decreasing power output. Similarly, loads can also be configured to have a delay before connecting or disconnecting to the microgrid and/or increasing or decreasing power demand. The length of the delays can correspond to the local voltage measured by the device. For sources, higher local Vrms can correspond to a shorter delay when decreasing power output. Conversely, higher local Vrms can correspond to a longer delay when increasing power output. For loads, lower local Vrms can correspond to a shorter delay when decreasing power demand and a longer delay when increasing power demand. The different delays before changes in power output or demand by each of the devices can also help avoid large power steps on the microgrid at threshold frequency levels.

In some embodiments, the power interface device is configured to absorb transient power variations in the microgrid caused by changes in levels of power generation and demand. As the frequency of the voltage is being used to control behavior of the devices, the power interface device (e.g., a frequency converter) absorbs changes in power to provide a filtered output frequency to control the microgrid. For example, FIG. 10A shows a graph 1000 of an example step down in production of power by the microgrid and a corresponding response of the power interface device. A first line 1006 shows a drop in a power level 1004, of the sources, showing a drop in power produced. A second line 1008 shows a corresponding drop in a power level 1004 of the loads, which steps down later over time 1002. The step down of the load power is determined by the change in frequency Fnom 1014 as shown along the x-axis. The power interface device absorbs power in a first section 1010 before the drop in produced power 1006. The power interface device provides power in a second section 1012, the amount of power provided and absorbed by the power interface device represented by the area between the first and second lines 1006, 1008. The absorbing and providing of power to compensate the differences between the first and second lines 1006, 1008 allows the frequency Fnom 1014 to remain steady and change under a control algorithm to provide commands to the devices, such as instructing the loads to demand less power in this example.

Figure 10B:
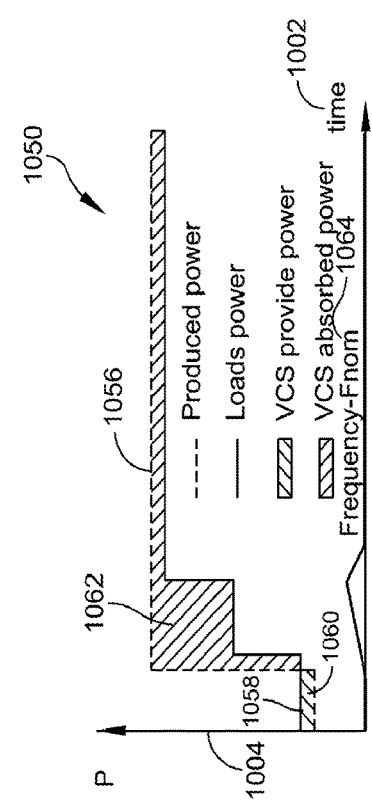
FIGS. 10A and 10B are graphs showing an example load adjustment in accordance with an embodiment.
Figure 10A:
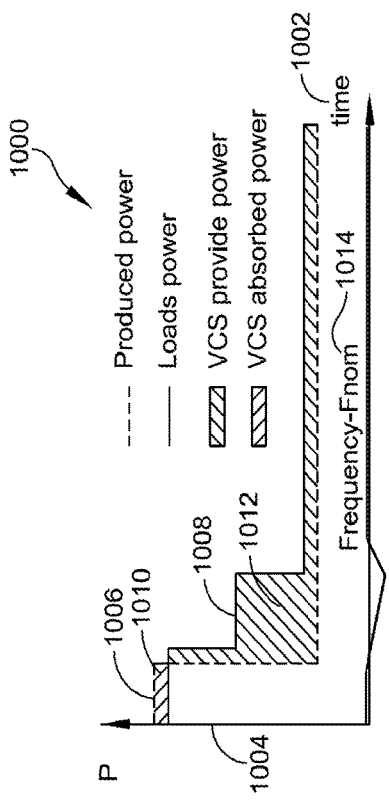

FIG. 10B shows a graph 1050 of an example step up in production of power by the microgrid and a corresponding response of the power interface device. A first line 1056 shows an increase in the power level 1004 of the sources, showing an increase in power produced. A second line 1058 shows a corresponding increase in the power level 1004 of the loads, which steps up later over time 1002. The step up of the load power is determined by the change in frequency Fnom 1064 as shown along the x-axis. The power interface device provides power in a first section 1060 and absorbs power in a second section 1062, similar to an inversion of the graph 1000 of FIG. 10A.

Figure 11:
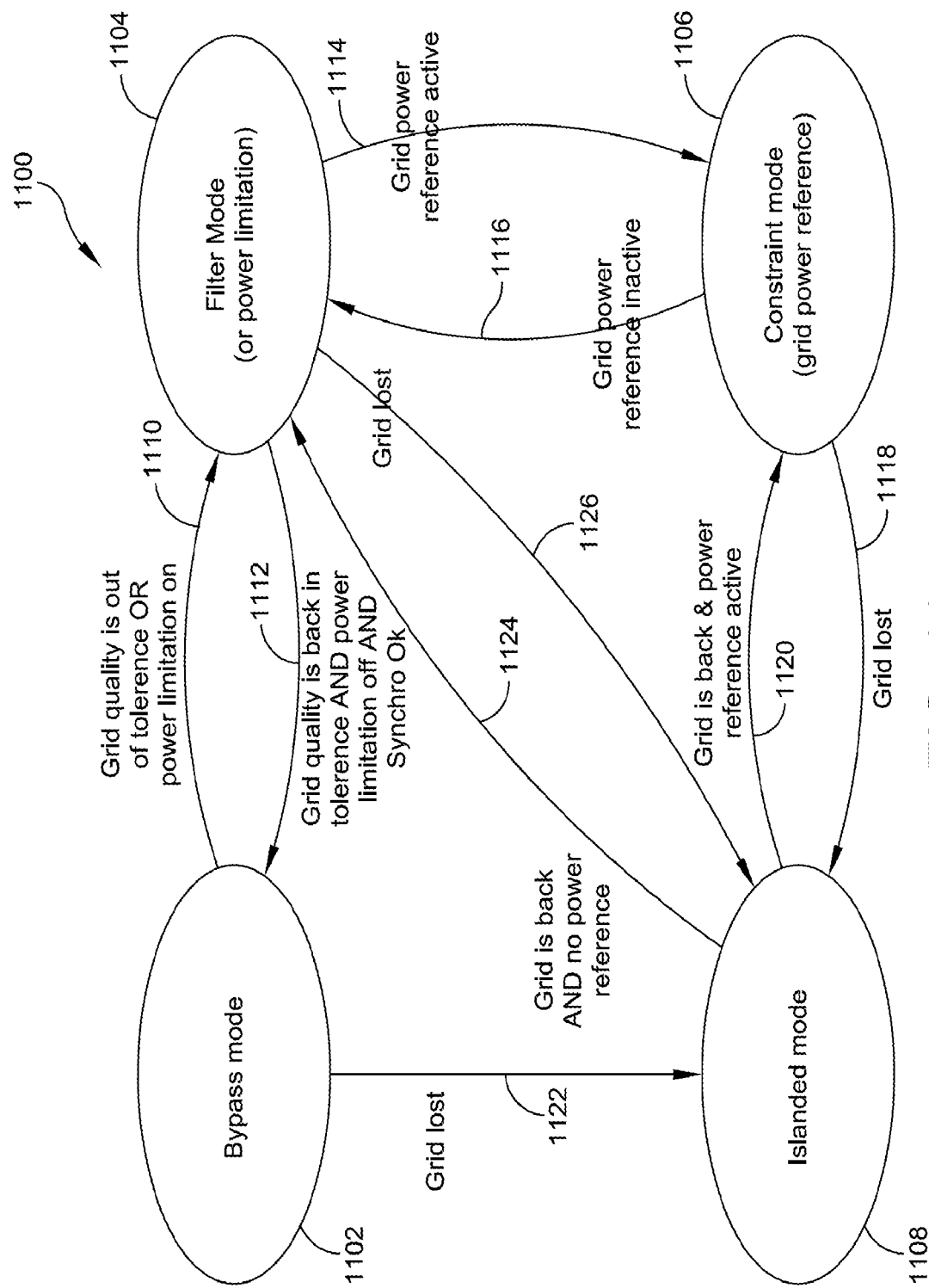
FIG. 11 is an example state machine diagram in accordance with an embodiment.

FIG. 11 shows an example state machine diagram 1100 of operating modes of the microgrid 200 and power interface device 212. In a bypass mode 1102, the grid 230 is providing power to the microgrid 200, bypassing at least some components of the power interface device 212. For example, the microgrid 200 and power interface device 212 can run in bypass mode 1102 depending on a quality of the power received from the grid 230. If the grid power quality is out of tolerance or a limitation is placed on the amount of power to be received by the microgrid 200 from the grid 230 (1110), the microgrid 200 and power interface device 212 can run in a filter mode 1104.

In filter mode 1104 the microgrid 200 can remain connected to the grid 230 and receive or provide power filtered through the power interface device 212. An example filter mode 1104 and algorithm for the power interface device 212 is described above with reference to FIG. 3A. The microgrid 200 and the power interface device 212 can return to bypass mode 1102 if the grid power quality returns to a tolerable level and the power limitation is removed or (1112). In some embodiments, returning to bypass mode 1102 from filter mode 1104 involves synchronization between the microgrid 200 and the grid 230. During synchronization, the frequency of the microgrid 200 can be changed to match the frequency of the grid 230. In some embodiments, fnom 316 is chosen to match the frequency of the grid 230. In some embodiments, flimn and flimp are configured on each device such that the frequency of the grid 230 is between flimn and flimp. Thus, in bypass mode 1102, devices on the microgrid 200 are instructed to continue operation, as each device is operating in respective zone ones (FIGS. 4-6).

From filter mode 1104, if a grid power reference is provided or activated (1114), the microgrid 200 and power interface device 212 can run in a constraint mode 1106. Example constraint modes and corresponding algorithms for the power interface device 212 are discussed above with reference to FIG. 3C. The microgrid 200 and power interface device 212 can return to filter mode 1104 from constraint mode 1106 if the grid power reference is removed or deactivated (1116).

If the grid 230 is lost or disconnected from the microgrid 200, the microgrid 200 and power interface device 212 can run in an islanded mode 1108. The islanded mode 1108 and corresponding algorithm for the power interface device 212 is described above with reference to FIG. 3B. The islanded mode 1108 can be reached from any of the other states upon loss of the grid 230 (1118, 1122, 1126). If the grid 230 returns or is reconnected and a power reference is provided, the microgrid 200 and the power interface device 212 can return to constraint mode 1106. If the grid 230 returns or is reconnected and a power reference is not provided, the microgrid 200 and the power interface device 212 can return to filter mode 1104.

Figure 12:
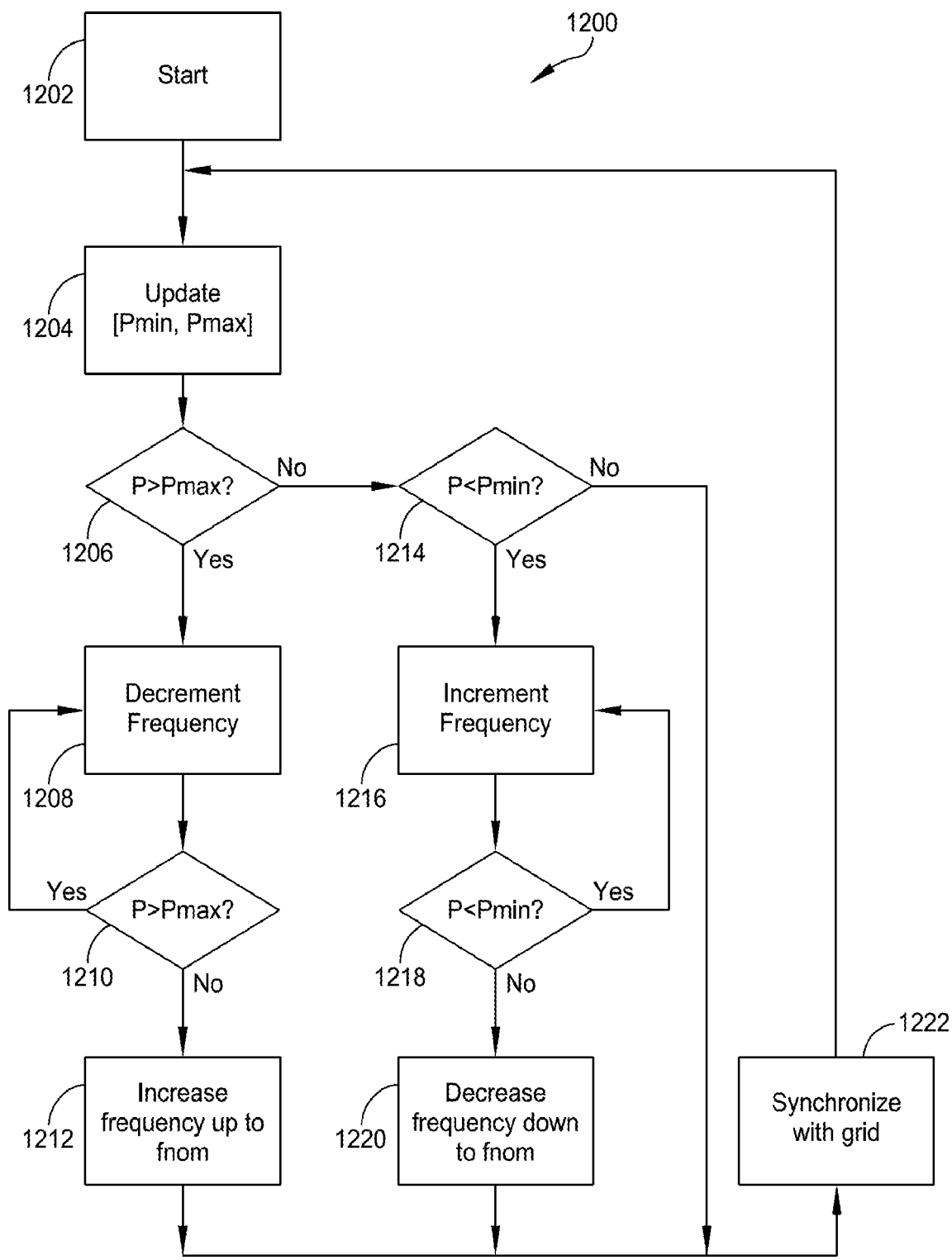
FIG. 12 is a flow chart showing an example process of a power interface device in accordance with an embodiment.

FIG. 12 shows a flow chart of an example process 1200 on the power interface device 212. The process 1200 starts with act 1202. At act 1204, the power interface device 212 updates a minimum power Pmin and a maximum power Pmax. The Pmin and Pmax are determined based on an operating mode of the power interface device 212. In filter mode 1104, Pmin and Pmax are set depending on power limits of the power interface device 212, such as power limits set by a manufacturer of the power interface device 212. In islanded mode 1108, Pmin is set by the battery state of charge controller and can vary between 0 and the maximum battery charge power (negative power). Pmax can vary between 0 and the power limit of the power interface. Its value is set by the state of charge controller. Pmax will be equal to zero when battery is empty and near the power limit when battery is full. In power reference mode, Pmin and Pmax are equal to a reference Pref provided by the grid. In grid power limitation mode, Pmin and Pmax are respectively equal to PrefMin and Prefmax references provided by the grid.

At act 1206, the power output of the microgrid, P, is compared to the appropriate Pmax depending on the operating mode of the power interface device 212. If P is greater than Pmax, at act 1208, the output frequency of the power interface device 212 is decremented. At act 1210, the power output of the microgrid P is again compared to Pmax. If P is still greater than Pmax, the process 1200 returns to act 1208 and the output frequency is again decremented. If P is no longer greater than Pmax, at act 1212, the output frequency is increased to fnom 316. The power interface device 212 synchronizes with the grid at act 1222. Thus, if the grid power is within a tolerance band (frequency, amplitude, distortion in tolerance), the power interface device 212 adjusts the output voltage phase to be in phase with the grid voltage, and the power interface device 212 can enter a bypass mode.

If initially at act 1206, P is not greater than Pmax, P is compared to Pmin at act 1214. If P is not less than Pmin, the power interface device 212 synchronizes with the grid at act 1222. If P is less than Pmin, the output frequency of the power interface device 212 is incremented at act 1216. At act 1218, P is again compared to Pmin. If P is still less than Pmin, the process 1200 returns to act 1216 and the output frequency is incremented again. If P is no longer less than Pmin, the output frequency is decreased to fnom 316 at act 1220. The power interface device 212 synchronizes with the grid at act 1222.

Figure 13:
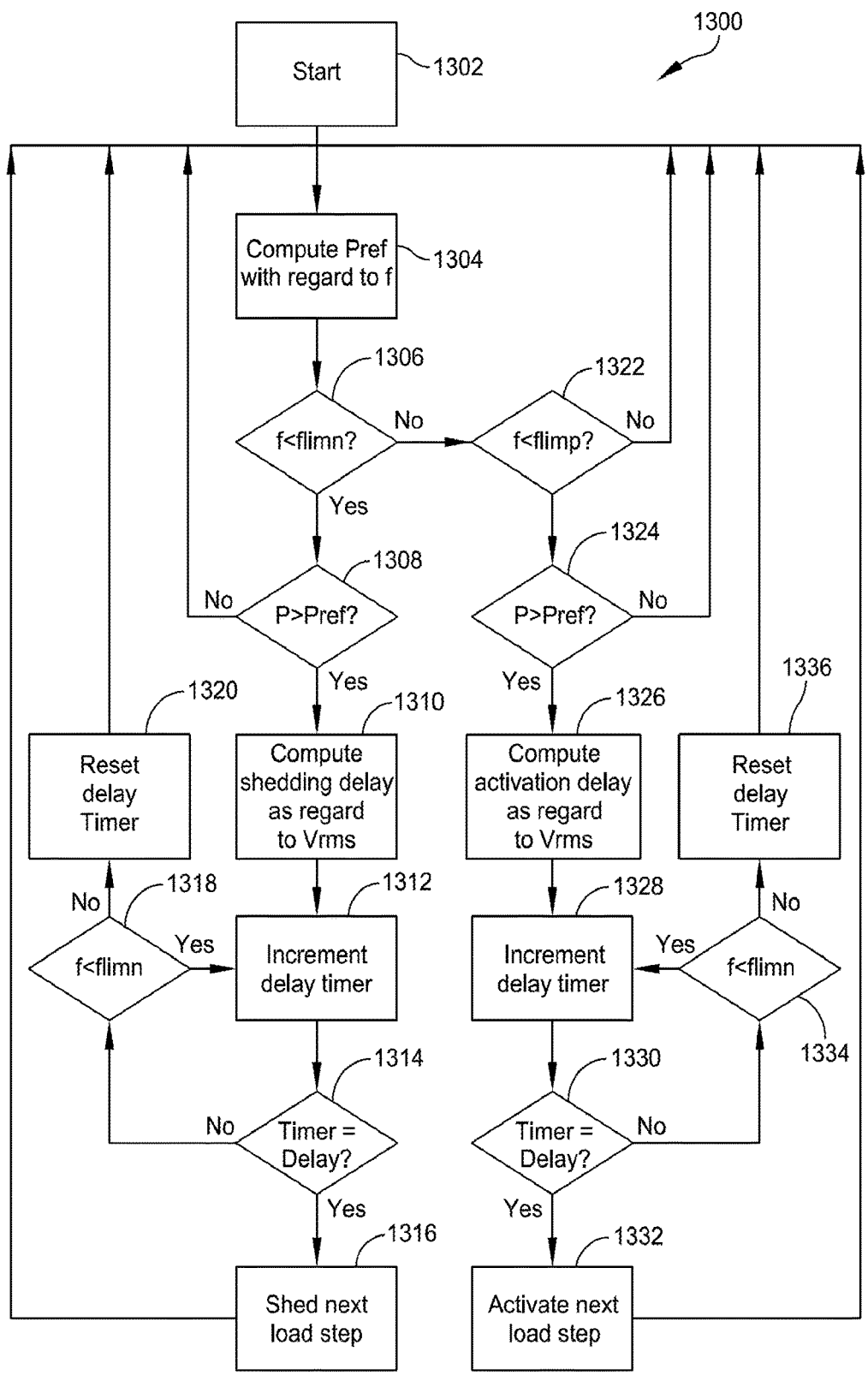
FIG. 13 is a flow chart showing an example process of a load in accordance with an embodiment.

FIG. 13 shows a flow chart of an example process 1300 for controlling a load of the microgrid 200. The process 1300 starts at act 1302. At act 1304, a reference load level Pref (520) is determined with regard to the voltage frequency measure on AC Bus 222, and in accordance to FIG. 5. At act 1306, if the measured frequency is lower than the level flimn (510), it means that the microgrid load is at a critical load level. Then at act 1308, if actual load power P, is greater than Pref, a process of load shedding is engaged at act 1310, If P is less than Pref, the process returns to act 1304. If P is greater than Pref, a shedding delay process is computed depending on the local voltage Vrms at act 1310. The shedding delay process for loads based on the local voltage is described above. At act 1312, a delay timer is incremented. At act 1314, the delay timer is compared to the computed shedding delay. If the timer has reached the shedding delay, a load step is shed at act 1316, for example, by shutting down a component of the load. If the timer has not reached the shedding delay, at act 1318, the frequency f is measured again and compared again to flimn. If f is no longer less than flimn, the delay timer is reset at act 1320 and the process returns to act 1304. If f is still less than flimn, the process 1300 returns to act 1312 and the delay timer is incremented.

If initially f is not less than flimn at act 1306, f is compared to flimp at act 1322. If f is not greater than flimp, the process 1300 returns to act 1304. If f is greater than flimp, P is compared to Pref at act 1324. If P is not less than Pref, the process 1300 returns to act 1304. If P is less than Pref, an activation delay is computed depending on the local voltage Vrms at act 1326. The activation delay process for loads based on the local voltage is also described above. At act 1328, a delay timer is incremented. At act 1330, the delay timer is compared to the computed activation delay. If the timer has reached the activation delay, a load step is activated at act 1332, for example, by activating a deactivated component of the load. If the timer has not reached the activation delay, at act 1334, the frequency f is compared again to flimp. If f is no longer greater than flimp, the delay timer is reset at act 1336 and the process returns to act 1304. If f is still greater than flimp, the process 1300 returns to act 1328 and the delay timer is incremented.

Figure 14:
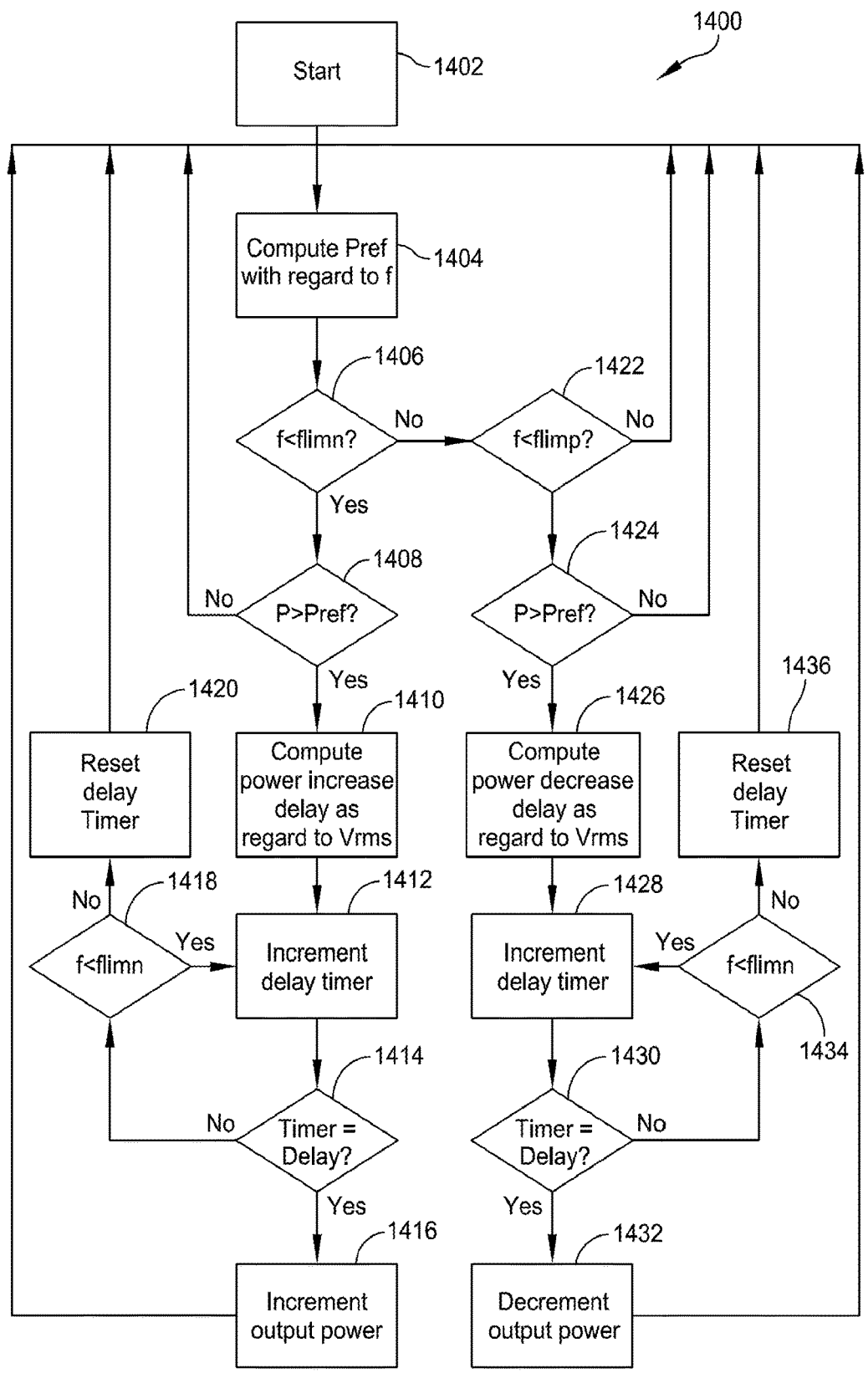
FIG. 14 is a flow chart showing an example process of a source in accordance with an embodiment.

FIG. 14 shows a flow chart of an example process 1400 on a source of the microgrid 200. The process 1400 starts at act 1402. At act 1404, a power reference level Pref is determined (e.g., the MPPT level 406 of FIG. 4). At act 1406, the received output frequency of the power interface device 212, f, is compared to flimn. If f is less than flimn, the actual output power of the source, P, is compared to Pref at act 1408. If P is less than Pref, the process returns to act 1404. If P is greater than Pref, a power increase delay is computed depending on the local voltage Vrms at act 1410. The power increase delay process for sources based on the local voltage is described above. At act 1412, a delay timer is incremented. At act 1414, the delay timer is compared to the computed power increase delay. If the timer has reached the power increase delay, the output power is incremented at act 1416. If the timer has not reached the power increase delay, at act 1418, the frequency f is measured and compared again to flimn. If f is no longer less than flimn, the delay timer is reset at act 1420 and the process returns to act 1404. If f is still less than flimn, the process 1400 returns to act 1412 and the delay timer is incremented.

If initially f is not less than flimn at act 1406, f is compared to flimp at act 1422. If f is not greater than flimp, the process 1400 returns to act 1404. If f is greater than flimp, P is compared to Pref at act 1424. If P is not less than Pref, the process 1400 returns to act 1404. If P is less than Pref, a power decrease delay is computed depending on the local voltage Vrms at act 1426. The power decrease delay for sources based on the local voltage is also described above. At act 1428, a delay timer is incremented. At act 1430, the delay timer is compared to the computed power decrease delay. If the timer has reached the power decrease delay, the output power is decremented at act 1432. If the timer has not reached the power decrease delay, at act 1434, f is compared again to flimp. If f is no longer greater than flimp, the delay timer is reset at act 1436 and the process returns to act 1404. If f is still greater than flimp, the process 1400 returns to act 1428 and the delay timer is incremented.

Having now described some illustrative embodiments, it is apparent that the foregoing is illustrative and not limiting, having been presented by way of example. In particular, although many of the examples presented herein involve specific combinations of method acts or system elements, it is understood that those acts and those elements may be combined in other ways to accomplish the same objectives. Acts, elements and features discussed only in connection with one embodiment are not intended to be excluded from a similar role in other embodiments.

Note that in the figures, enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes non-transitory and other data signals embodied in one or more of a carrier wave, a computer disk (magnetic, or optical (e.g., CD or DVD, or both)), non-volatile memory, tape, a system memory, and a computer hard drive. Further, in some embodiments, a control system for a microgrid may include one or more controllers contained in different microgrid elements including one or more of a power interface device, a load, and a power generator.

Any references to front and back, left and right, top and bottom, or upper and lower and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any embodiment disclosed herein may be combined with any other embodiment, and references to "an embodiment,"

"some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms. Intervening embodiments, acts, or elements are not essential unless recited as such. Any solution to a problem, or any element or act presented herein in the alternative, for example using the word "or," is neither ambiguous nor indirect simply because it may be presented in the alternative. Any such alternative embodiments, solutions, elements, or acts are derivable directly and unambiguously as at least one embodiment independent of any other alternative solutions, elements, or acts.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the characteristics thereof. For example, the power interface device can be a single phase or three phase uninterruptible power supply. Further, couplings between uninterruptible power supply components include direct couplings and indirect couplings where intervening elements may be present. The controller can include combinations of hardware, software, and firmware, as well as application specific integrated circuits, programmable logic devices, and processors. Input power can be provided by the AC power source, or any second or backup power source, and combinations thereof.

Embodiments described with input power from any of these sources may encompass variations thereof where power is provided at least in part from another of these sources. The inverter can have different topologies, and can include two-level and three-level inverters and other topologies or multilevel topologies including four level topologies. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for controlling a microgrid comprising a power interface device coupled to a plurality of microgrid elements comprising power sources and loads, the method comprising:
   determining, by the power interface device, a mode of operation of the microgrid;
   determining a power load of the plurality of microgrid elements; and
   based on the mode of operation of the microgrid and the power load of the plurality of microgrid elements, adjusting, by the power interface device, a frequency of a voltage of the power interface device to communicate one or more instructions to at least one microgrid element of the plurality of microgrid elements.

2. The method of claim 1, further comprising:
   receiving, by the plurality of microgrid elements, the voltage; and
   based on the frequency, adjusting an input or output power of the plurality of microgrid elements.

3. The method of claim 2, wherein adjusting the frequency of the voltage of the power interface device comprises increasing the frequency of the voltage over a first threshold;
   wherein receiving the voltage comprises receiving the voltage by a load of the plurality of microgrid elements; and
   wherein adjusting the input or output power comprises increasing the input power of the load.

4. The method of claim 2, wherein adjusting the frequency of the voltage of the power interface device comprises increasing the frequency of the voltage over a second threshold;
   wherein receiving the voltage comprises receiving the voltage by a power source of the plurality of microgrid elements; and
   wherein adjusting the input or output power comprises decreasing the output power of the power source.

5. The method of claim 2, wherein adjusting the frequency of the voltage of the power interface device comprises decreasing the frequency of the voltage below a third threshold;
   wherein receiving the voltage comprises receiving the voltage by a power source of the plurality of microgrid elements; and
   wherein the adjusting the input or output power comprises increasing the output power of the power source.

6. The method of claim 2, wherein adjusting the frequency of the voltage of the power interface device comprises decreasing the frequency of the voltage below a fourth threshold;
   wherein receiving the voltage comprises receiving the voltage by a load of the plurality of microgrid elements; and
   wherein adjusting the input or output power comprises decreasing the input power of the load.

7. The method of claim 1, further comprising configuring upper and lower thresholds for the plurality of microgrid elements based on a type of the microgrid elements.

8. The method of claim 1, wherein the power interface device is coupled to an energy storage system, and wherein the method further comprises:
   receiving by the energy storage system, the voltage; and
   based on the frequency of the voltage, adjusting an input or output power of the energy storage system.

9. The method of claim 8, wherein the power interface device is coupled to a generator, and wherein the method further comprises:
   receiving by the generator, the voltage; and
   based on the frequency of the voltage, adjusting an output power of the generator.

10. A control system for a microgrid having a plurality of microgrid elements comprising:
    a power interface device including:
       a first power interface configured to couple to an electric utility;
       a second power interface configured to couple to the microgrid;
       a power conversion circuit coupled to the first power interface and the second power interface; and a controller coupled to the power conversion circuit, the controller configured to:
  determine a mode of operation of the microgrid;
  detect an output power from the plurality of microgrid elements; and
  based on the mode of operation of the microgrid and the output power from the plurality of microgrid elements, adjust a frequency of a voltage at the second power interface to communicate one or more instructions to at least one of the plurality of microgrid elements.

11. The control system of claim 10, wherein the control system is further configured to:
  based on the frequency of the voltage, adjust an input or output power of the plurality of microgrid elements.

12. The control system of claim 10, wherein the control system is further configured to:
  adjust the frequency of the voltage of the output power by increasing the frequency of the voltage over a first threshold; and
  in response to increasing the frequency, increase the input power of a load coupled to the microgrid.

13. The control system of claim 10, wherein the control system is further configured to:
  adjust the frequency of the voltage of the output power by increasing the frequency of the voltage over a second threshold; and
  in response to increasing the frequency, decrease the output power of a power source of the microgrid.

14. The control system of claim 13, wherein the control system is further configured to:
  adjust the frequency of the voltage of the output power by decreasing the frequency of the voltage below a third threshold; and
  in response to decreasing the frequency, increase the output power of the power source.

15. The control system of claim 12, wherein the control system is further configured to:
  adjust the frequency of the voltage of the output power by decreasing the frequency of the voltage below a fourth threshold; and
  in response to decreasing the frequency, decrease the input power of the load.

16. The control system of claim 10, wherein the control system is further configured to configure upper and lower thresholds for the plurality of microgrid elements based on a type of at least one microgrid element of the plurality of microgrid elements.

17. The control system of claim 10, wherein the microgrid includes an energy storage system, and wherein the control system is further configured to:
  based on the frequency of the voltage, adjust an input or output power of the energy storage system.

18. The control system of claim 17, wherein the microgrid includes a generator, and wherein the control system is further configured to:
  based on the frequency of the voltage, adjust an output power of the generator.

19. A microgrid comprising:
  a plurality of microgrid elements comprising a power source and a load; and
  a power interface device comprising:
    a first power interface configured to couple to an electric utility;
    a second power interface configured to couple to the plurality of microgrid elements;
    a power conversion circuit coupled to the first power interface and the second power interface; and
    a controller coupled to the power conversion circuit, the controller configured to:
      determine a mode of operation of the microgrid; and
      based on the mode of operation of the microgrid, adjust a frequency of a voltage provided by the power interface device to communicate one or more instructions to at least one of the plurality of microgrid elements.

20. The microgrid of claim 19, wherein the load is configured to receive the voltage and based on the frequency adjust a power draw of the load, and wherein the power source is configured to receive the voltage, and based on the voltage adjust a power output level of the power source.

* * * * *